United States Patent
Thakkar et al.

(10) Patent No.: US 12,222,815 B2
(45) Date of Patent: Feb. 11, 2025

(54) EFFICIENT DICTIONARY DATA STRUCTURE TO FIND SIMILAR BACKUP CLIENTS

(71) Applicant: EMC IP Holding Company LLC, Hopkinton, MA (US)

(72) Inventors: Smriti Thakkar, San Jose, CA (US); Tony T. Wong, Milpitas, CA (US); Abhinav Duggal, Jersey City, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 825 days.

(21) Appl. No.: 17/125,536

(22) Filed: Dec. 17, 2020

(65) Prior Publication Data

US 2022/0197755 A1    Jun. 23, 2022

(51) Int. Cl.
| | | |
|---|---|---|
| *G06F 11/14* | (2006.01) | |
| *G06F 16/174* | (2019.01) | |
| *G06F 18/2113* | (2023.01) | |
| *G06F 18/22* | (2023.01) | |
| *G06F 18/23* | (2023.01) | |

(52) U.S. Cl.
CPC ...... *G06F 11/1453* (2013.01); *G06F 11/1435* (2013.01); *G06F 11/1464* (2013.01); *G06F 16/174* (2019.01); *G06F 18/2113* (2023.01); *G06F 18/22* (2023.01); *G06F 18/23* (2023.01)

(58) Field of Classification Search
CPC .......................... G06Q 10/063; G06T 11/206
See application file for complete search history.

(56) References Cited

U.S. PATENT DOCUMENTS

| | | | | |
|---|---|---|---|---|
| 10,303,797 | B1* | 5/2019 | Menezes | G06F 16/1727 |
| 2019/0332492 | A1* | 10/2019 | Marelas | G06F 16/137 |
| 2020/0210478 | A1* | 7/2020 | Wada | G06F 16/211 |
| 2020/0233597 | A1* | 7/2020 | Beskales | H03M 7/3091 |

OTHER PUBLICATIONS

S. Long, Z. Li, Z. Liu, Q. Deng, S. Oh and N. Komuro, "A similarity clustering-based deduplication strategy in cloud storage systems," 2020 IEEE 26th International Conference on Parallel and Distributed Systems (ICPADS), Hong Kong, 2020, pp. 35-43, doi: 10.1109/ICPADS51040.2020.00015. (Year: 2020).*

* cited by examiner

*Primary Examiner* — Mark D Featherstone
*Assistant Examiner* — Samuel C Sharpless, III
(74) *Attorney, Agent, or Firm* — Workman Nydegger (57) ABSTRACT

One example method includes generating a fingerprint:tag dictionary that includes a group of fingerprints and a group of tags, and the fingerprint:tag dictionary identifies, for each fingerprint, the tag or tags which include that fingerprint, computing a similarity matrix based on the fingerprint:tag dictionary, and the similarity matrix identifies, for each pair of tags in the fingerprint:tag dictionary, a relative similarity of the tags in the pair to each other, running a clustering algorithm to identify groups of similar tags in the similarity matrix, and deduplicating, based on the groups of similar tags, respective data associated with the fingerprints.

20 Claims, 9 Drawing Sheets

| | Tag 1 | Tag 2 | Tag 3 | .. | Tag N-1 | Tag N |
|---|---|---|---|---|---|---|
| Tag 1 | - | J(1,2) | J(1,3) | J(1,..) | J(1, N-1) | J(1,N) |
| Tag 2 | - | - | J(2,3) | J(2,..) | J(2, N-1) | J(2,N) |
| Tag 3 | - | - | - | J(3,..) | J(3, N-1) | J(3,N) |
| ... | - | - | - | - | J(..,N-1) | J(..,N) |
| Tag N-1 | - | - | - | - | - | J(N-1,N) |
| Tag N | - | - | - | - | - | - |

|  | CPU Complexity (Section A) | Memory Footprint (Section B) | Numerical Analysis of CPU Complexity (Section C) | I/O Read Ops (Section D) | Numerical Analysis of read IOs (Section E) |
|---|---|---|---|---|---|
| Brute Force | $O((M^2) * (N \log N))$ | 7.74 GB | 18227 billion | $T^2 * F/k$ | 72 million |
| Bloom Filter | $O((M^2 * n))$ | 2592 GB | 129600000 billion | $T^2 * s$ | 1008 million |
| FP:Tag Dictionary | $O(N * (m^2))$ | 9.6 GB | 15 billion | $F/r$ | 286 |

EFFICIENT DICTIONARY DATA STRUCTURE TO FIND SIMILAR BACKUP CLIENTS

FIELD OF THE INVENTION

Embodiments of the present invention generally relate to data deduplication. More particularly, at least some embodiments of the invention relate to systems, hardware, software, computer-readable media, and methods for maximizing, or at least improving, data deduplication across the nodes of a cluster.

BACKGROUND

The term 'tag' has sometimes been used to refer to a union of files that all have the same tag ID. The tag itself may be considered as constituting a large file. Some backup software platforms may assign tag IDs to user files, and files bearing the same tag ID may be placed on the same data node by a data deduplication system. As such, the tag may serve as a hint, from the client that generated the data, to the data deduplication system that a set of files with a particular tag may deduplicate well together. Generations of the backup from the same client can be placed on the same data node to take advantage of the deduplication feature.

However, data from different clients can also share common data, for example, tags from the same version of the operating system or applications. Some deduplication systems may assign new tags to the data nodes in a round robin fashion as those deduplication systems cannot determine if a new tag is similar to any of the existing tags. This approach may result in a loss in global deduplication savings since even though data may be common to different clients, that data is not deduplicated. The loss in the global deduplication savings can be significant. Also deduplication typically occurs only within a single data node. Thus, for example, if similar tags are placed on 2 different nodes, there will be 2 copies of the data, increasing capacity usage of the cluster and thereby at least partly reducing the efficiency of the deduplication functionality.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data deduplication. More particularly, at least some embodiments of the invention relate to systems, hardware, software, computer-readable media, and methods for maximizing, or at least improving, data deduplication effectiveness and efficiency across multiple nodes of a data cluster.

In general, example embodiments of the invention may be configured to facilitate achievement of the goal of maximizing deduplication in a cluster, so as to automatically improve capacity usage. To maximize deduplication, some embodiments are directed to a solution which may serve to identify tags that deduplicate well with each other and place them on the same node in the cluster. Note that as used herein, the phrase 'finding a cluster of similar tags' embraces finding tags that deduplicate well with each other.

Conventional approaches typically look at tags pairwise and then compare the fingerprints that belong to the tags, such as through the use of an inefficient brute force algorithm. In contrast, embodiments of the invention may employ a more efficient data structure that implements a configuration and approach that are fundamentally different from conventional approaches. That is, at least some example embodiments may employ a data structure that implements inverse mapping, that is, mapping of a fingerprint to a tag dictionary, where the key of the dictionary is the fingerprint of a data segment and its record contains all the tags that share the fingerprint.

Note that as used herein, a 'fingerprint' refers to a unique, or nearly so, identifier of a piece of data, such as a data segment for example. The fingerprint may be derived from the content of the data segment, such as by hashing the data segment with a SHA-1 hashing process to generate the fingerprint.

In more detail, embodiments of the invention may calculate an input similarity matrix, particularly, a Jaccard similarity matrix, from the fingerprint-tag dictionary data structure. The disclosed data structures may be particularly useful in enabling the efficient calculation of the similarity matrix efficiently, where such efficiency may be considered in terms of, for example, space consumed and/or I/O complexity. The similarity matrix may then be used to identify tags that deduplicate relatively well, and those tags may then be placed on the same node in a cluster of nodes.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which large numbers, such as millions or billions for example, of tags, comparisons, and bits, may be handled and processed by a data management and/or data deduplication system. Such handling and processing is well beyond the mental capabilities of any human to perform practically, or otherwise. Thus, while other, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the amount of memory needed to identify the similarities among a group of tags may be significantly smaller than is used in conventional approaches to similarity determinations. Another advantageous aspects of some embodiments is that the CPU complexity associated with similarity determinations may be significantly less than the CPU complexity associated with conventional approaches. As another example, an advantageous aspect of some embodiments is that the number of IOs (Input/Output operations) needed to effect similarity determinations may be significantly less than the IOs required by conventional approaches.

A. Aspects of an Example Architecture and Environment

The following is a discussion of aspects of example operating environments for various embodiments of the invention. This discussion is not intended to limit the scope of the invention, or the applicability of the embodiments, in any way.

Figure 1:
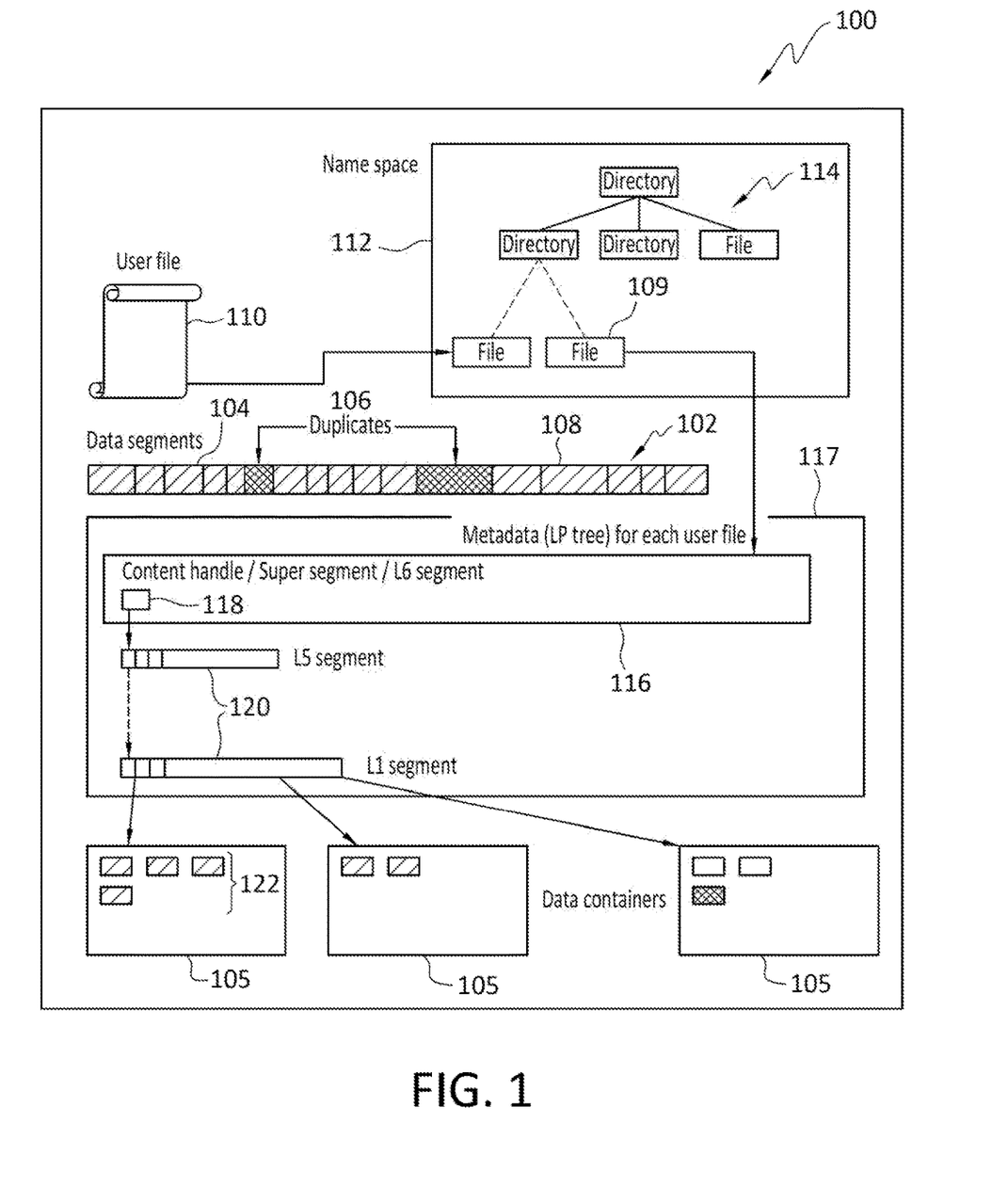
FIG. 1 discloses aspects of an example operating environment.

At least some example embodiments may be employed in connection with a filesystem, an example of which is denoted at 100 in FIG. 1. The file system 100 may comprise, or consist of, a DellEMC Data Domain File System (DDFS), but that is not required. As data 102 enters the file system 100, the data may be segmented into segments 104 and filtered against existing segments to remove duplicates 106. Any unique data segments 108 may then be stored in fixed size immutable containers 105. The content handle 109 of the file 110 may be kept in the file system namespace 112 to support the directory hierarchy 114. The content handle 109 may point to a super segment 116 which may hold the reference to the top of the segment tree 117 of the file. The super segment 116 may point to a top reference 118 that may point to metadata 120 and data segments 122. In the illustrated example, metadata segments are LPs (from L6 to L1) and data segments are L0s.

As noted herein, one goal of some example embodiments is to maximize the extent to which deduplication can be performed in cluster so as to improve usage of the data storage capacity of the cluster. To this end, embodiments of the invention may operate to identify tags that deduplicate well with each other, and place them on the same node in the cluster. A 'tag' may serve as a proxy for a client, and may be employed in systems such as the DellEMC Data Domain File System (DDFS). In some instances, the word 'tag' may be synonymously exchanged with 'files.' This is because a tag may simply be a 64 bit number assigned by a client to a group of files. A tag is a union of files of the same tag ID. The tag itself can be considered a big file. Note that from the perspective of the algorithm, a 'file' and a 'tag' are synonymous in that they both refer to a collection of data segments that are each identified by a corresponding fingerprint. A backup software platform may use a protocol, such as a DDFS-specific protocol for example, to assign a 64-bit tag ID (assumed to be unique) to user files and DDFS will place files of the same tag on the same data node. It is expected that files from the same backup client would be assigned the same tag. The examples of FIGS. 2 and 3 illustration some concepts that involve the use of tags.

Figure 2:
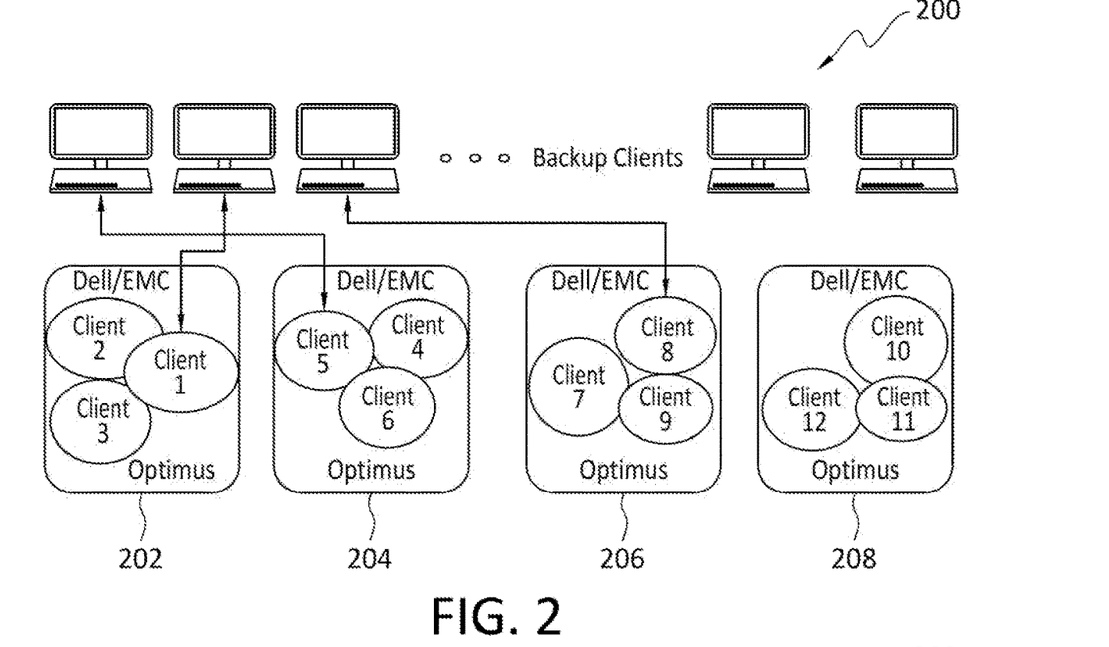
FIG. 2 discloses duplicated storage of data segments.

In particular, FIG. 2 illustrates an example of a global deduplication deficiency. Specifically, FIG. 2 shows a cluster configuration 200 in which similar tags are placed on different respective nodes, and the respective data associated with those tags is not deduped across the nodes. For example, respective data associated with tags of clients 3, 6, 7 and 10 are the same, but those same data are present on four different nodes of the cluster, namely, nodes 204, 206, 208, and 210. That is, the same data exists on four different nodes. Similarly, the common respective data associated with tags of clients 1, 5, and 8 are likewise distributed across multiple nodes 202, 204, and 206, and the common respective data associated with the tags of clients 2, 4, 9, and 11 are stored on different respective nodes 202, 204, 206, and 208. This approach is inefficient because the same data is stored in multiple locations. That is, there is no deduplication of data that are common to multiple clients across the nodes 202, 204, 206 and 208.

Figure 3:
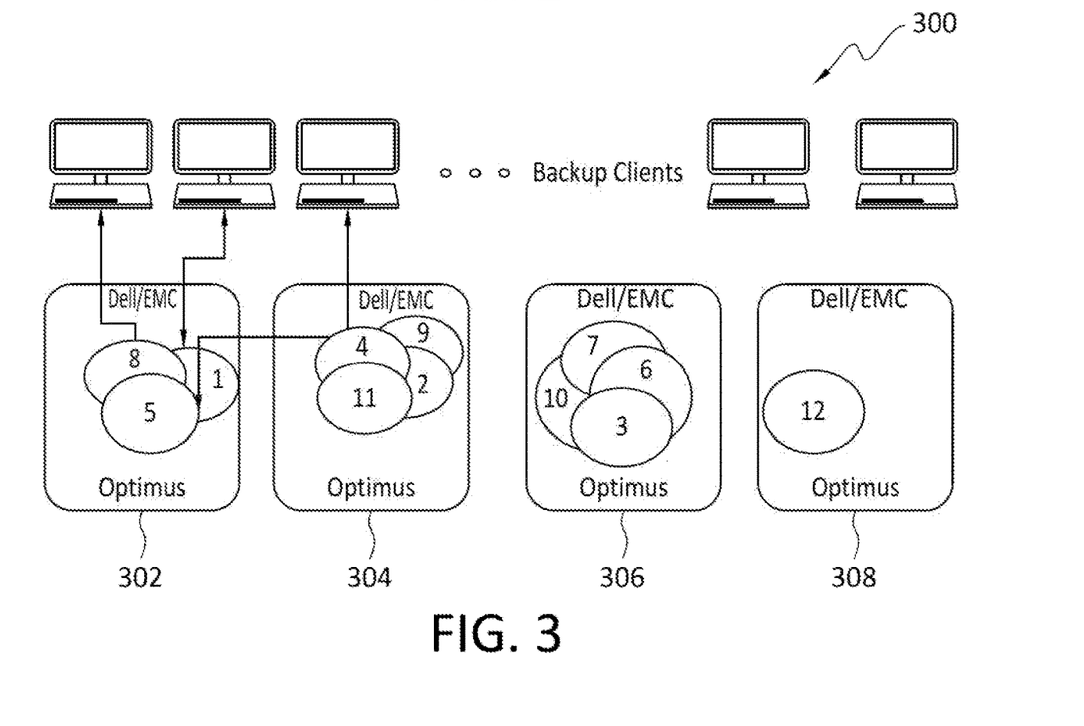
FIG. 3 discloses efficient storage of data segments.

In contrast, FIG. 3 discloses an ideal placement of the data of FIG. 2 in a cluster 300. Similar or identical data are placed on the same node to take advantage of local deduplication, and those data may then be deduplicated at the corresponding node. In particular, clients 1, 5 and 8 each have data in common that are stored at node 302. Similarly, clients 2, 4, 9 and 11 each have data in common that are stored at node 304. Clients 3, 6, 7 and 10 each have data in common that are stored at node 306. Data from client 12 is stored at node 308. Because nodes 302, 304, and 306, each have multiple copies of the same data, that data may be deduplicated to reduce storage consumed at the respective nodes.

B. Aspects of Some Example Embodiments

With the examples of FIGS. 2 and 3 in view, details are provided concerning some example embodiments. In general, to find similar tags, and thereby enable effective and efficient deduplication at one or more nodes of a cluster, an agglomerative hierarchical clustering technique may be employed. In this technique a similarity matrix is calculated or determined which is an input to the agglomerative hierarchical clustering algorithm, and the output is a hierarchy of similar tags. Thus, example embodiments are directed to calculating the input similarity matrix, the Jaccard similarity matrix from the fingerprint-tag dictionary data structure. The data structure may be especially key in helping facilitating efficient calculation of the similarity matrix, in terms of space and I/O complexity. Thus, one or more example embodiments may employ the use of a fingerprint-tag dictionary data structure to compute the pairwise similarity of all the tags. As well, one or more example embodiments may provide a compute, memory and I/O efficient solution to generate the similarity matrix from the fingerprint-tag dictionary data structure.

B.1 Background and Overview

As data enters a file system, such as DDFS for example, the data may be segmented and filtered against existing segments to remove duplicates. Any unique data segments are then stored in fixed size immutable containers. The content handle of the file is kept in the file system namespace to support the directory hierarchy. The content handle points to super segment which holds the reference to the top of the segment tree of the file. Super segment points to top reference that points to metadata and data segments. Metadata segments are LPs (from L6 to L1) and data segments are L0s. Segments may be packed into immutable containers of about 4.5 MB in size, for example. There may be a meta data section in the header of the container that describes the fingerprints and their location in the container.

The segments (L6, L5 . . . L0) may be identified by a 24 byte fingerprint 20 byte SHA1 hash value and a 4 byte XOR. The file system may maintain an index table of segment fingerprint to container mapping. This approach allows fast lookup to determine if a segment exists and where it is located. If a data segment X is shared between multiple files, that is, multiple files such as files A and B include one or more of the same segments, the file system may only create one L0 segment and that L0 segment may be referenced by a L1 segment in file A and another L1 segment in file B. This is the essence of data deduplication, that is, determining the extent to which multiple files contain the same segments so that those segments can be deduplicated.

In order to determine what percentage of file/tag A and file/tag B are similar, one method might be to compare the all the L0 fingerprints that belong to tag A with the L0 fingerprints that belong to tag B. If the fingerprints match, then it may be concluded that the associated data segments are shared between the two tags A and B. Also, the segment sizes may be known. Thus, when the fingerprints are compared and the shared segment sizes summed up, and another counter is employed to give a total union size of all the segments belonging to both the tags, the percentage of data shared between the two tags can then be easily determined. The extent to which data is shared between multiple tags is referred to as the Jaccard similarity measure. The following is illustrative of the general principle.

To simplify the algorithm, all segments may be assumed to have a fixed size. The number of fingerprints alone is used in the calculation of the Jaccard Index. The Jaccard index 'J,' or Jaccard similarity measure, between tags/files X and Y is as follows:

$J(X,Y)=|X \cap Y|/|X \cup Y|$, where:

$|X \cap Y|$ is the count of fingerprints common between X and Y; and $|X \cup Y|$ is the union count of all unique fingerprints of X and Y.

Thus, the X and Y tags are totally distinct from each other if $J(X, Y)=0$, and the X and Y tags are identical to each other if $J(X, Y)=1$. A clustering algorithm according to some example embodiments may require the similarity matrix where the i-j th entry is the Jaccard index of tag i and tag j. If there are M tags in the system, then the similarity matrix is a M*M symmetric matrix, as shown in the example matrix 400 of FIG. 4.

Figure 4:
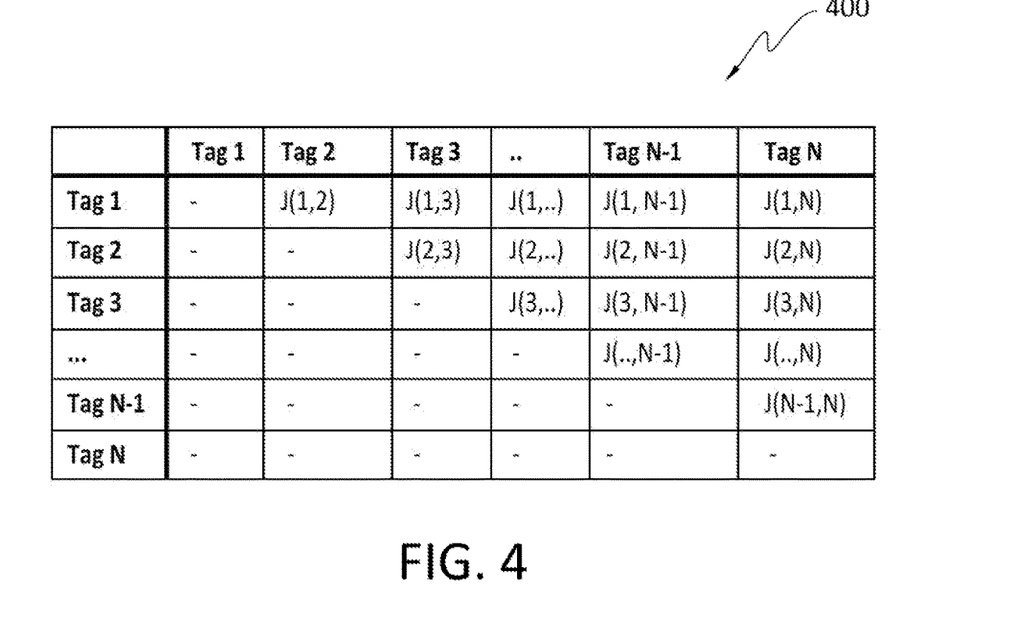
FIG. 4 discloses an example similarity matrix.

Particularly, FIG. 4 discloses a Jaccard similarity matrix, or simply 'Jaccard matrix,' for N tags. As shown, a Jaccard similarity J may be calculated for each tag with respect to one or more other tags. Thus, for example, J (1,2) may be calculated for tags 1 and 2, J (1,3) and J (2,3) may be calculated, respectively, for tags 1 and 2 with respect to tag 3, and so forth, for any number of tags N.

A Jaccard similarity matrix may be calculated in various ways. In the following section, two possible approaches are addressed, and then compared with an approach employed by at least some example embodiments. Because the number of segments that may need to be evaluated can be quite large, possibly in the millions or billions, or more, the relative efficiency, such as with respect to memory usage, CPU complexity, and/or IOs required, of the calculation method employed can be important since relatively inefficient approaches may not be practical for use.

In more detail, the following sections will consider: use of a brute force approach to calculate the Jaccard Similarity matrix; and use of a Bloom filter to calculate Jaccard Similarity matrix. These approaches will then be compared with approaches according to some embodiments of the invention which may employ a new data structure, particularly, a fingerprint to tag dictionary that is used to calculate Jaccard Similarity matrix. As will be seen, this latter approach to Jaccard matrix calculation may be significantly more efficient than the brute force and Bloom filter approaches to Jaccard matrix calculation.

Figure 5:
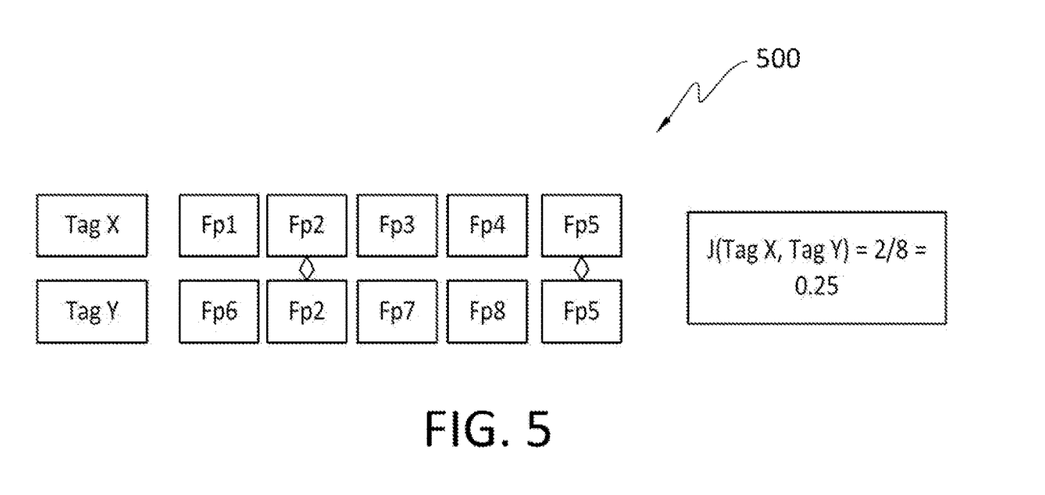
FIG. 5 discloses an example computation for an entry in the similarity matrix.

With reference now to FIG. 5, details are presented that include an algorithm description and CPU complexity for the three aforementioned approaches in calculating a Jaccard Similarity Matrix. The first approach, as noted, is referred to herein as a brute force approach in which a mechanism is employed to calculate J(X, Y) by directly comparing the fingerprints of the two tags X and Y, and populating a similarity matrix 500, as shown in FIG. 5. In this simple illustrative example, only two tags are compared, and each tag has only 5 fingerprints. In a real world situation, any number N of tags may be compared, and each tag may include tens of thousands, hundreds of thousands, millions, billions, or more, fingerprints. Thus, the example of FIG. 5 is exaggerated in terms of its simplicity.

In FIG. 5, each fingerprint of tag X may be compared with each fingerprint of tag Y, which results in the conclusion that that tags have 2 segments in common, namely, Fp2 and Fp5. This is the brute force approach. As noted earlier herein, $J(X,Y)=|X \cap Y|/|X \cup Y|$, where:

$|X \cap Y|$ is the count of fingerprints common between X and Y; and $|X \cup Y|$ is the union count of all unique fingerprints of X and Y.

Thus, in the example of FIG. 5, J(X,Y)=2/8, or 0.25. That is, there are 2 common fingerprints Fp2 and Fp5, and a total of 8 unique fingerprints included in the combination of tag X and tag Y, that is, fingerprints Fp1 . . . Fp8.

The aforementioned comparison of the respective fingerprints of tag X and tag Y has an associated time complexity $O(N^2)$ which is the time complexity involved in comparing the fingerprints, where N is the average number of fingerprints in a tag. If the fingerprints are sorted in order, and then compared, the time complexity may be improved somewhat to O(N log N). However, to generate the Jaccard similarity matrix, this comparison process would have to be performed for every pair of tags. Thus, if there are M total tags, the CPU complexity to calculate the Jaccard distance becomes O((M^2)*(N log N)).

Another possible approach to calculating a Jaccard similarity matrix may involve the use of a bloom filter/sketches. Particularly, the bloom filter, which may be referred to as sketches, may be can be used to estimate the Jaccard index for a pair of tags as follows:

$$|X \cap Y|/|X \cup Y| = (|X|+|Y|-|X \cup Y|)/|X \cup Y|,$$

where |X|, |Y| may be estimated using the sketches for X, Y. The sketch of X∪Y is simply the union of the sketches of X and Y.

Thus, if there are M files, there will be MC2 combinations of |X∪Y|. To compute all the pairwise similarities, all these sizes of their unions must be computed and the bloom filter bits be compared. If there are n bits in the bloom filter, The CPU complexity is O((M^2*n)). Note that 'n' may be a large constant.

B.2 Example Embodiments Fingerprint Tag Dictionary

Figure 6:
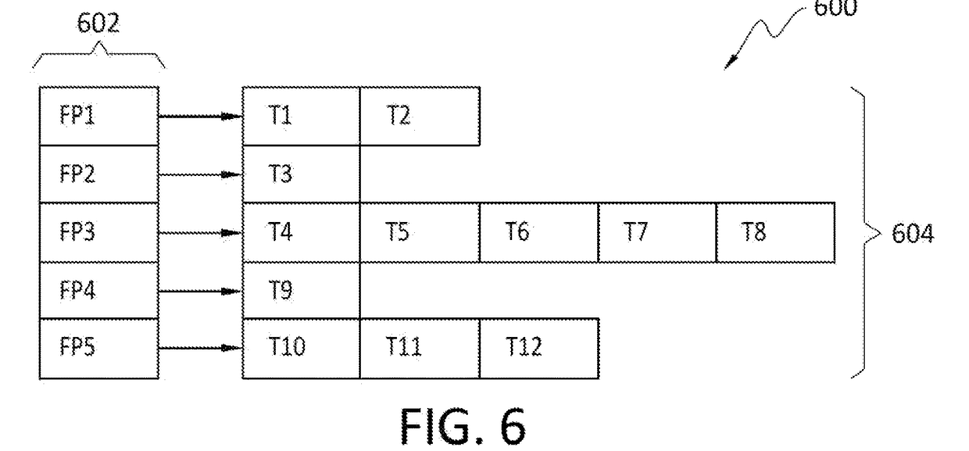
FIG. 6 discloses an example fingerprint:tag dictionary structure.

With reference now to FIG. 6, an example fingerprint dictionary, or simply 'dictionary,' 600 is disclosed that maps one or more fingerprints 602 to one or more tags 604. The approach disclosed in FIG. 6 differs from an approach such as the brute force approach at least in that instead of looking at the tags pairwise and then comparing the Fps that belong to the tags, as in the brute force algorithm, embodiments of the invention may build and employ a more efficient data structure, that is, the fingerprint dictionary 600. This fingerprint dictionary 600 may embody an inverse mapping, that is, mapping of fingerprints to tags, in which the key of the dictionary is the fingerprint Fp of a data segment and the record for that fingerprint contains all the tags that share the fingerprint, as shown in FIG. 5. Thus, for example, the record for fingerprint Fp3 indicates that tags T4, T5, T6, T7, and T8, all contain fingerprint Fp3.

It may be very efficient for a deduplication engine to compute the similarity matrix from the example fingerprint-tag dictionary 600. Particularly, to compute the Jaccard similarity pairwise between tags, only one scan of the fingerprint-tag dictionary 600 is needed. To illustrate, assume that there are M tags and N number of fingerprints in the dictionary 600. Let X be the similarity matrix. Let S be an array of the fingerprint counts for each tag. Both X and S may be initialized to a value of 0.

The similarity matrix, that is, similarity values of a similarity matrix, may then be computed for object pairs generally as follows:

The dictionary entries may be read sequentially for each fingerprint key k. If the dictionary entry (list of tags that include the fingerprint k) is the set V={$T_{k1}$, $T_{k2}$, $T_{k3}$, ... $T_{kn}$}, then increment X[$k_i$, $k_j$] by 1 for each pair of entries $T_{ki}$, $T_{kj}$ in V and $k_i$ !=$k_j$.

Also increment S(T) by 1 for all the T's in the set V.

When all the dictionary entries have been iterated, X[i, j] will contain the number of fingerprint common to both Ti and Tj. The Jaccard index, or similarity value, for a tag pair Ti and Tj can be computed as X[i, j]/(S[i]+S[j]−X[i, j])

The matrices are symmetric so compute only either the upper triangular matrix or the lower one.

Consider N fps in the system and M total number of tags. Then let "m" be the average number of tags for every finger print record, where m<<M. The CPU complexity is O(N* (m^2)).

Following are aspects of an illustrative example of a similarity matrix and associated calculations. In general, at each step of a clustering process to identify similar objects for possible deduplication, the pairwise similarity of all the objects, or tags, remaining need to be computed. This can be viewed as a matrix, and insofar as the matrix, or similarity matrix, indicates the similarity of all the object pairs, that similarity information can be used to make decisions concerning deduplication. As disclosed in more detail elsewhere herein, the similarity matrix may be examined and the two objects in the object pair with the highest similarity in the similarity matrix may then be combined with each other. This process, which may be referred to as a 'clustering process' implemented by a clustering algorithm, results in elimination of one element, that is, object, from the similarity matrix. This examination and combination process may be performed repetitively until there is one entry, or object, left in the similarity matrix, and the clustering process is complete.

Suppose, for example, there are 8 objects with respective IDs 1, 2, 3, 4, 5, ... 8. To generate the similarity matrix, the similarity 'J' of each pair of objects must be determined, where an object pair may be designated generally as (i, j), and the matrix is two dimensional and has a size i×j (and i=j). However, because the similarity matrix is symmetrical, e.g., the similarity of object pair (1,2) is the same as the similarity of object pair (2,1), only half of the matrix need actually be calculated. Note that where two objects are identical to each other, their similarity is '1' and where the two objects are completely different from each other, their similarity is '0.'

With reference to the example matrix below, various relationships will be apparent. Particularly, given this matrix (with similarities shown already calculated),

|   | 1 | 2 | 3 | 4 | 5 | 6 | 7 | 8 |
|---|---|---|---|---|---|---|---|---|
| 1 | 1 | 0.4 | xxx | yyy | ... |   |   | 0.8 |
| 2 | 0.4 | 1.0 | 0.6 | ... |   |   |   | 0.2 |
| 3 | xxx | 0.6 | 1.0 | 0.3 | ... |   |   | ... |
| ... |   |   |   |   |   |   |   |   | various similarities J for object or tag pairs can be observed in this example matrix. Particularly, it can be observed that the similarity J (1,1)=1 (the similarity of an object to itself will always be 1), the similarity J of the object pair 1,2 (and 2,1)=0.4; J (1,3)=xxx; J (1,4)=yyy; J (1, 5)=J (1,8)=0.8; J (2,3)=0.6, J (2,4)=J (2,8)=0.2, J (3,4)=0.3, J (3, 5)= ... , and J (3,8)= ... .

The computation process noted above, which may be referred to herein as a clustering algorithm, may be able to quickly compute all the similarities J in a matrix, such as this example matrix, given a specified set of fingerprints and associated tags, or objects, that include those fingerprints. This is true for matrices of any size, including relatively large matrices, even those with millions, billions, or more, tags and/or fingerprints. The clustering algorithm may be performed as an iterative process. For example, based on the similarities in the matrix above, the object pair with the highest similarity may be combined. Thus, for example, objects 1 and 8, whose similarity is 0.8, may be combined to define a new object, or combination, #9. Objects 1 and 8 may then be removed, and a new similarity matrix calculated for objects 9, 2, 3, 4, 5, 6, and 7. This same general process of combining and recalculating may iteratively continue until no objects remain and a similarity matrix can no longer be calculated. Following are some illustrative examples of calculating similarity values J.

In general, to compute a similarity J between tags or objects, the number of fingerprints Fp common to both tags must be known, and the number of unique Fps in each tag must be known. As noted earlier herein, the similarity between a pair of tags according to some example embodiments may be expressed as: $X[i,j]/(S[i]+S[j]-X[i,j])$, where $X[I,j]$ is the number of Fps common to tags Ti and Tj, and $(S[i]+S[j])$ is the union of all Fps collectively included in tags Ti and Tj. Subtracting the common Fps from the union of Fps leaves the number of unique Fps. The following example illustrates some concepts relating to similarity calculations.

Given the following fingerprint:tag dictionary with a total of 6 objects (object ID) and 5 fingerprints (FP):

| FP | object ID |
|---|---|
| Xxx (Fp1) | 1 |
| Xxx (Fp2) | 4, 5 |
| Xxx (Fp3) | 1, 4 |
| Xxx (Fp4) | 2, 8 |
| Xxx (Fp5) | 1, 2, 3 |
| ... | | attention is directed to the illustrative object pair (1,2) and, particularly, the calculation of the similarity between objects 1 and 2, that is, J (1,2).

In general, the entire L0 (data segment) dictionary may be scanned. In this illustrative example, after scanning the above dictionary up to the fifth Fp, it can be seen that the size of 1=3 (object 1 contains 3 fingerprints, i.e., Fp1, Fp3 and Fp5), the size of 2=2 (object 2 contains 2 fingerprints, i.e., Fp4 and Fp5), and objects 1 and 2 have 1 fingerprint in common (i.e., Fp5). Thus, X[1,2]=1, and (S[i]+S[j])=4 (Fp1, Fp3, and Fp5 for object 1, and Fp4 for object 2). With this information, J (1,2) can now be calculated. Particularly, J(1,2)=1/(3+1−1)=⅓, or 0.33.

As part of the dictionary scan, other information may also be computed such as, for example, the sizes of the objects in terms of the number of Fps those objects contain. Thus, the size of object 1 is 3, the size of object 3 is 1, the size of object 4 is 2, the size of object 5 is 1, the size of objects 6 and 7 is 0, and the size of object 8 is 1.

In addition to, or as part of, the scan and other computations, the intersections for the object pairs, that is, the number of Fps that object pairs have in common. Thus, the intersections would be as follows: (4,5)=1 (only Fp2 is common to both objects 4 and 5), (1,4)=1 (Fp3), (2,8)=1 (Fp4), (1,3)=1 (Fp5), (2,3)=1 (Fp5), and everything else remains 0. All of this information, that is, the object sizes and intersections, may be obtained with a single scan of the dictionary. This information can then be used to iteratively calculate similarity matrices until no objects remain.

B.3 Comparative Examples—Memory, CPU, IOs

Attention is directed now to a comparison of the different respective memory requirements of the brute force and bloom filter methods as compared with an example embodiment of the invention that may employ a fingerprint tag dictionary to determine the extent of similarity between pairs of tags. In general, the discussion assumes that all the data structures have been loaded into memory and there are no IOs performed after the loading.

Following are some example parameters employed to enable the comparison of techniques—these parameters are presented only by way of example:

12 node 96 TB cluster;
4 K segment size after compression;
1/1024 sampling;
20% similarity between tags;
maximum 1000 tags on each system node;
maximum number of fingerprints per node is 25 million; and
assume a 12 node cluster.

Given the aforementioned parameters, the memory requirement for supporting the brute force method of determining tag similarity may be determined as follows. The total logical size of each tag is 96 TB/1000*1.2=126 GB. Assuming an average segment size of 4096, the total number of fingerprints is 31 million. Apply a 1/1024 sampling and use 20 (SHA1 hash) bytes to represent the fingerprints, the total amount of memory to represent 1000 tags will be 31 million/1024*20*1000=645 MB for one node, and the total amount of memory required for 12 nodes is 7.74 GB.

Next, the memory requirement for the bloom filter/sketches approach to determining tag similarity is considered. In this evaluation, each tag is considered as being represented by a bloom filter. Also, in the sketch-based algorithm, all the files must maintain a sketch of the same size based on the overall size of the union of all the files. It is a basic requirement for the sketch unions and comparisons to work. For example, two files might contain the same L0 segment only if the same bit in the same position of the bloom filter.

To represent 96 TB, 1/1024 sampling, 20% similarity, 4 K segment size, the size of the bloom filter will have to be at least 96 TB/4096/1024*6/8=19 MB. 6 bits are reserved for each segment in order to achieve acceptable collision rate in the bloom filter (⇐7%). The total amount of memory for 1000 tags is 19 GB. To represent 96 TB*12, that is, total capacity of 12 nodes, 1/1024 sampling, 20% similarity, 4 K segment size, the size of the bloom filter will have to be at least 96 TB*12/4096/1024*6/8=216 MB. 6 bits are reserved for each segment in order to achieve acceptable collision rate in the bloom filter (⇐7%). Thus, the total amount of memory for 1000 tags is 216 GB. And total amount of memory for 12000 tags is 2592 GB.

Figure 7:
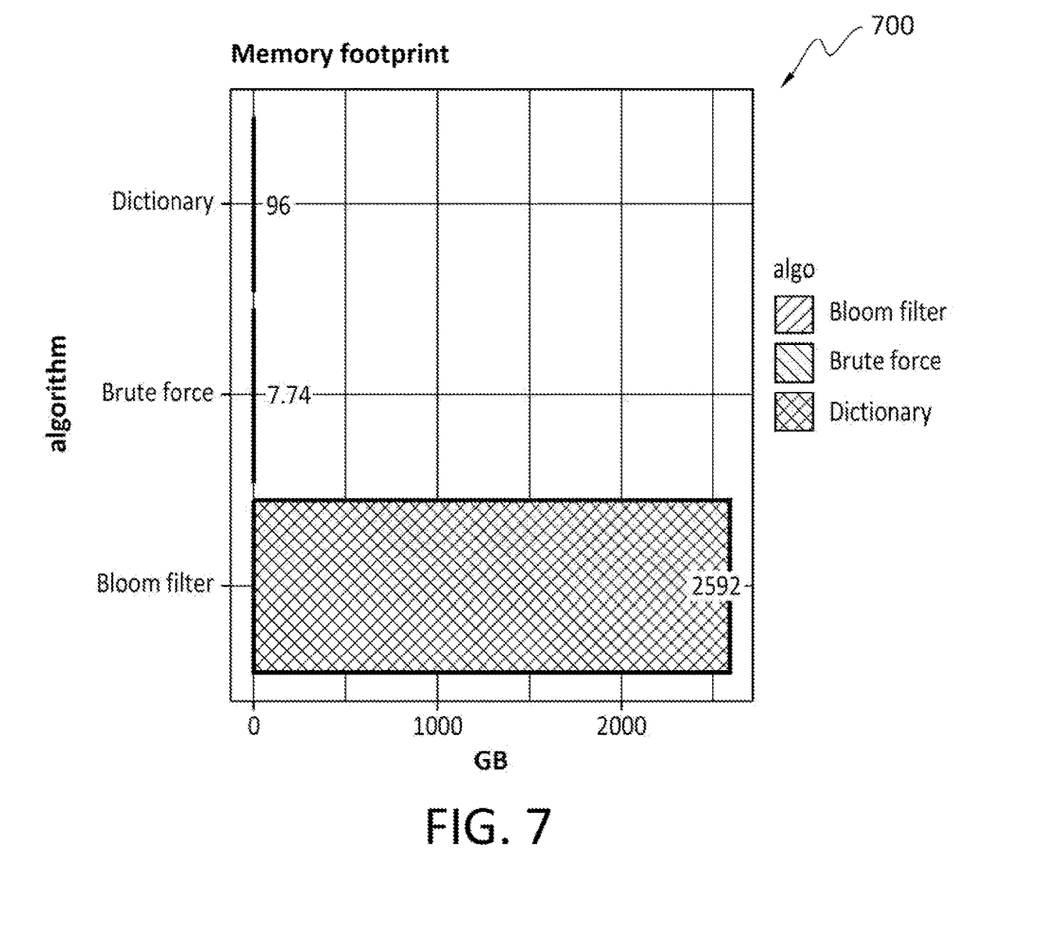
FIG. 7 graphically illustrates memory footprints of various similarity matrix calculation approaches.

Finally, the memory requirement for the fingerprint tag dictionary approach employed by some embodiments is considered. Based on the system assumptions noted above, the amount of memory for the dictionary keys is 25 million*20=500 MB. Assuming 20% similarity between tags, on average, there should be 1.2 tags per entry (rounded to 2 tags per entry for this example illustration). Each tag is 2 bytes. The total amount of memory for the dictionary entry approach (assuming a hash table implementation) is 25 million*(2*2)=100 MB. Depending on the implementation of the dictionary, there can be 8 byte overhead for each key. The total amount of memory per node is therefore 500 MB+100 MB+25 million*8=800 MB, and the total amount of memory for 12 nodes=9.6 GB. This is significantly less than the sketch-based requirement and the brute force approach. The graph 700 in FIG. 7 graphically illustrates a comparison of the respective memory requirement, or footprint, for each of the three approaches just discussed.

Attention is directed next to a comparison of the different respective CPU complexities associated with the brute force and bloom filter methods as compared with an example embodiment of the invention that may employ a fingerprint tag dictionary to determine the extent of similarity between pairs of tags. Following are some example parameters employed to enable the comparison of respective CPU complexities of the three techniques these parameters are presented only by way of example:

12 node 96 TB cluster;
4 K segment size after compression;
1/1024 sampling;
20% similarity between tags;
maximum 1000 tags on each system node;
maximum number of fingerprints per node is 25 million; and
assume a 12 node cluster.

Given the aforementioned parameters, the CPU complexity associated with the brute force method of determining tag similarity may be determined as follows. The CPU complexity to calculate the Jaccard distance is $O((M^2)*(N \log N))$, where M is the number of tags and N is the number of fingerprints. To compute the Jaccard index of two tags requires $N^2$ computations. For 12 nodes and 1000 tags per node, the total number of operations is $12000^2/2*N \log N$. N is about 25000 per tag. This can be expressed as $T^2/2*N \log N$. This gives a complexity of 1.822794e+13=18227 billion.

With reference next to determining CPU complexity for the bloom filter/sketch approach to determining tag similarity, if there are M files, and n bits in the bloom filter, the CPU complexity is $O((M^2*n))$. The total number of bits in the bloom filter=n=(total number of fingerprints system across 12 nodes/sampling*6) where 6 is the number of bits per fingerprint. The size of the bloom filter is about 1.8e+09 i.e. 1.8 billion bits. To compute the similarity between 2 tags, there are 1.8 billion comparisons. The complexity is $T^2/2*1.8$ billion=1.296e+17=129600000 billion.

Figure 8:
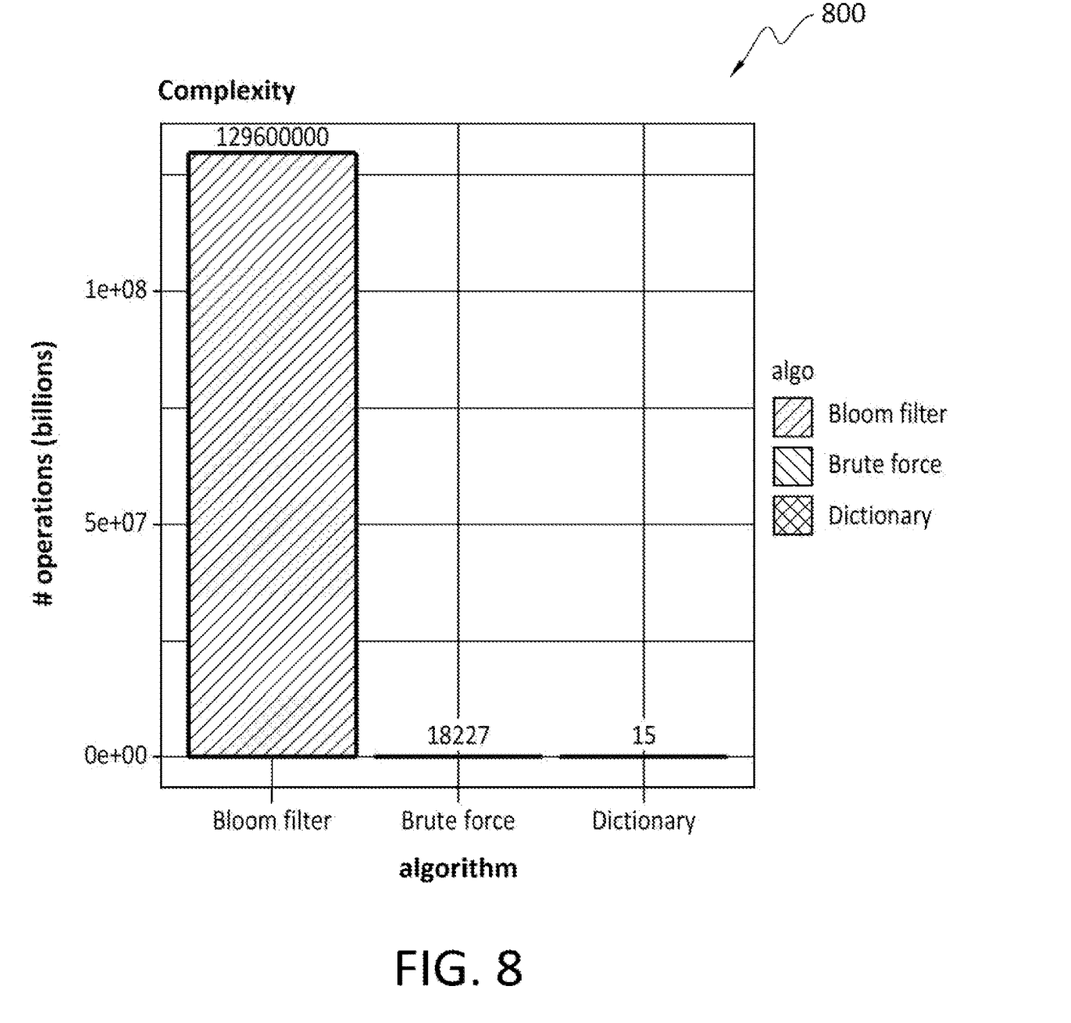
FIG. 8 graphically illustrates CPU complexity of various similarity matrix calculation approaches.

Finally, the CPU complexity for the fingerprint tag dictionary approach employed by some embodiments is considered. Consider N Fps (fingerprints) in the system and M total number of tags. Then let "m" be the average number of tags for every finger print record, where m<<M. The CPU complexity is $O(N*(m^2))$. The total number of dictionary entries is 300 million. The average number of tags in each entry is 2. The complexity is 300 million*2. This is the best case. It is possible that all the tags share the same common fingerprints. That would be the worst-case scenario. The total number of common fingerprints would be (300 million/1000)*0.2=60000 and the number of tags in these fingerprint entry is 1000. The number of operations to compute the similarity matrix is: $60000*1000^2/2+(300000000-60000)=30299940000$. Taking an average of these 2 numbers, the result is 15449970000, or approximately 15 billion. FIG. 8 discloses a graph 800 that compares the compute complexity assuming 12000 tags and 25000 fingerprints per tag. It can be seen that the tag dictionary approach employed by example embodiments involves significantly less compute complexity than either of the other two approaches.

As a final example, the three approaches for determining tag similarity may be compared in terms of the IOs needed to carry out those approaches. Based on the memory footprint, if the number of nodes is higher, then the memory requirements increase and the data structures cannot be stored in memory or cache. Thus, in this section a comparison is presented of the I/O complexity, assuming the minimum data structures are loaded from disk or an external memory. The I/O complexity is compared by analyzing the performance by counting the number of disk transfers.

With reference first to the brute force approach, assume that a "block size" of data can be read in a single operation from the external memory. Also assume that "k" fingerprints can fit in one block. Then for this brute force algorithm, the minimum read is an array of fingerprints for each tag. If there are F total fingerprints, then F/k blocks have to be read out in order to read all the fingerprints for one tag. The fingerprint comparison has to be done for every pair of tags. So if there are T tags, then $(T^2*F/k)$ is the total random IOs for reads for this algorithm.

In the bloom filter/sketch approach, the minimum data structure to be loaded is a pair of sketches. The sketches/bloom filters are of fixed size for every tag. It is assumed that a "block size" of data can be read in a single operation from the external memory, and that "s" blocks have to be read for every sketch. The sketches have to be loaded of every pair of tags as well. So if there are T tags, then $(T^2*s)$ is the total random IOs for reads required to performed by this algorithm.

Turning next to the fingerprint:tag dictionary approach that may be employed by some example embodiments, each record includes a fingerprint and an array of one or more tags that include that the fingerprint. The minimum read is a single fingerprint:tag record from the dictionary. The tag array is very small, so the number of records to be read can be simplified to be equal to the total number of fingerprints in the system. If there are F total fingerprints, then F records have to be read to scan the complete dictionary. Assume that a "block size" of data can be read in a single operation from the external memory, and that "r" fingerprint:tag records can be stored in one block. Then the total number of reads to process the entire dictionary is F/r. So (F/r) is the total sequential IOs for reads for this algorithm. One particular advantage of the fingerprint:tag dictionary approach is that given that the fingerprint:tag dictionary is laid out sequentially, and the external memory is considered to be a disk, then the reads/lookups are sequential when compared to the random reads/lookups to be done to read fingerprints or sketches for every pair of tags to memory in the Brute force or Bloom filter algorithm. Also when the number of IOs in the other two approaches are considered, those approaches both have $(M^2)$ multiplier, whereas the fingerprint:tag dictionary approach of some example embodiments has a linear complexity. Following are some numerical examples that illustrate the difference in IO requirements of the three approaches.

Particularly, the IOs needed for the three algorithms are compared using some illustrative numerical examples. Following are some example parameters employed to enable the comparison of respective IO requirements of the three techniques—these parameters are presented only by way of example:

12 node 96 TB cluster;
4 K segment size after compression;
1/1024 sampling;
20% similarity between tags;
maximum 1000 tags on each system node;

maximum number of fingerprints per node is 25 million; assume a 12 node cluster; and assume that a "block size" of data can be read in a single operation from the external memory and 16 MB is the block size.

Considering first the example of the brute force approach, if T is the number of tags and F is the number of fingerprints, and "r" fingerprint:tag records can be stored in one block, then (T^2*F/k) is the number of total random IOs for reads for this algorithm. If each fingerprint is 20 bytes (SHA1) then k=16 MB/20 bytes=838860. That is, it is possible to store and read 838860 fps per one block read. Thus, all 25000 fps can be stored in one 16 MB block. This can be expressed as 12000^2/2*1=7.2e+07 or 72 million random read IOs needed to perform the tag similarity analysis using the brute force approach.

With reference next to the bloom filter/sketches approach, if T is the number of tags and "s" blocks have to be read for every sketch, then (T^2*s) is the total random IOs for reads for this algorithm. In this approach, the sketch size is fixed for every tag, and is assumed to be 216 MB. If each block is 16 MB, 216/16~=14 blocks have to be read. s=14. This can be expressed as 12000^2/2*14=1.008e+09 or 1008 million random read IOs needed.

Figure 9:
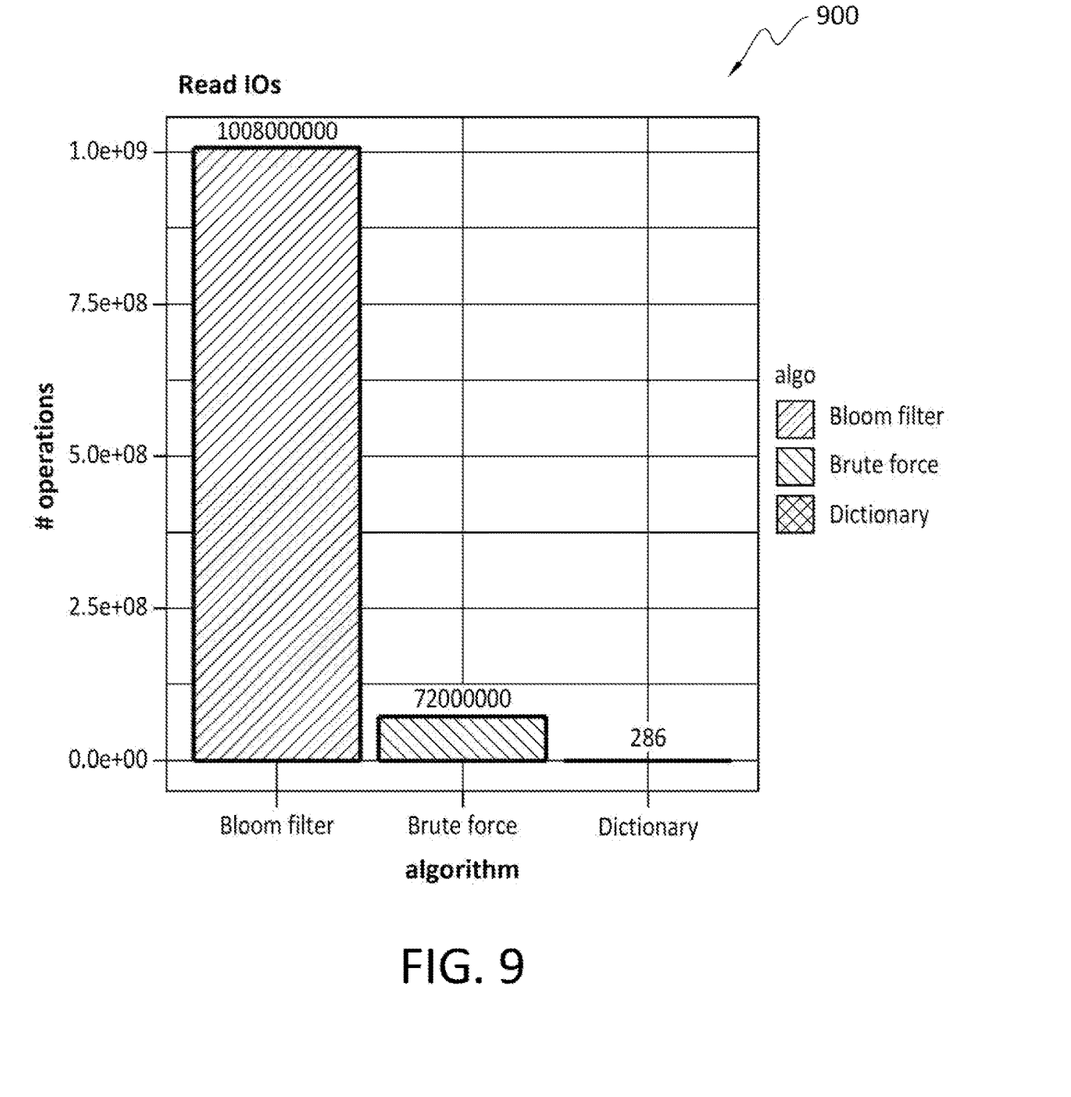
FIG. 9 graphically illustrates IO footprints of various similarity matrix calculation approaches.

Turning finally to the fingerprint:tag dictionary approach that may be employed in some embodiments, if F is the number of fingerprints and "r" fingerprint:tag records can be stored in one block, then (F/r) is the total sequential IOs for reads for this algorithm. Each Fp is 20 bytes. If 20% similarity between tags is assumed, on the average, there should be 1.2 tags per entry (rounded up to 2 tags per entry for this example). Each tag is 2 bytes. There can be 8 byte overhead for each key. So, each record is 20+4+1=25 bytes per record. If each block is 16 MB, r=16 MB/25 bytes=1048576, i.e. 1048576 fp:tag records can be stored in a 16 MB block. For 12 nodes and 25 million fps each, F=total records=(12*25000000). This can be expressed as (12*25000000)/1048576=286.1023, or 286 sequential read IOs. FIG. 9 shows a graph 900 that compares the read IOs needed assuming 12000 tags and 25000 fingerprints per tag.

Figure 10:
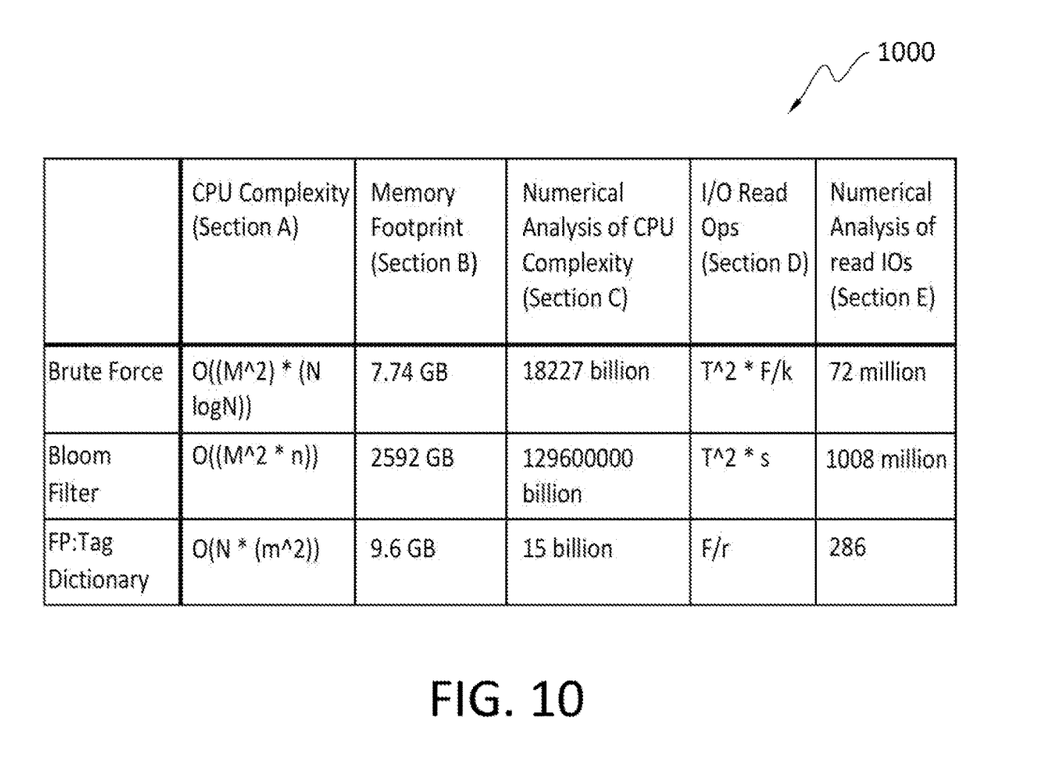
FIG. 10 compares three similarity calculation approaches and their respective memory, IO, and CPU complexity, footprints.

To briefly summarize aspects of the foregoing approaches, a table 1000 in FIG. 10 illustrates a comparison of all the three techniques in terms of CPU, I/O complexity and the memory footprint for a cluster system. Note that both the Memory Footprint and Numerical analysis is for the following Cluster Configuration: 12 node, 96 TB capacity cluster. 4 K segment size after compression. 1/1024 sampling, 20% similarity between tags, maximum 1000 tags on each system node. The maximum number of fingerprints per node is 25 million.

For the CPU complexity comparison: "M" is the number of tags, "m" the average number of tags, "N" the number of fingerprints, and "n" the number of bits in the bloom filter.

For the IO comparison: "T" is the number of tags, "F" the number of fingerprints. "block size" of data can be read in a single operation from the external memory: "k" is the number of fingerprints can fit in one block, "s" is the number of blocks required to store the fixed size sketches/bloom filter, "r" is the number of FP:tag dictionary records that are stored in a block.

It can be seen from the table 1000, and the graphs 700, 800, and 900, for example, that the fingerprint:tag dictionary data structure that may be employed in some embodiments to compute the pairwise similarity of all the tags is a compute, memory, and I/O, efficient solution to generate the similarity matrix for the hierarchical clustering algorithm. Once the similarities between tags has been established, such as by the aforementioned approach, a deduplication process can be carried out at those nodes where duplicate segments, or other portions, of data have been determined to exist. In this way, efficient use may be made of the storage available at each of one or more nodes in a cluster.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

C. Example Methods

Figure 11:
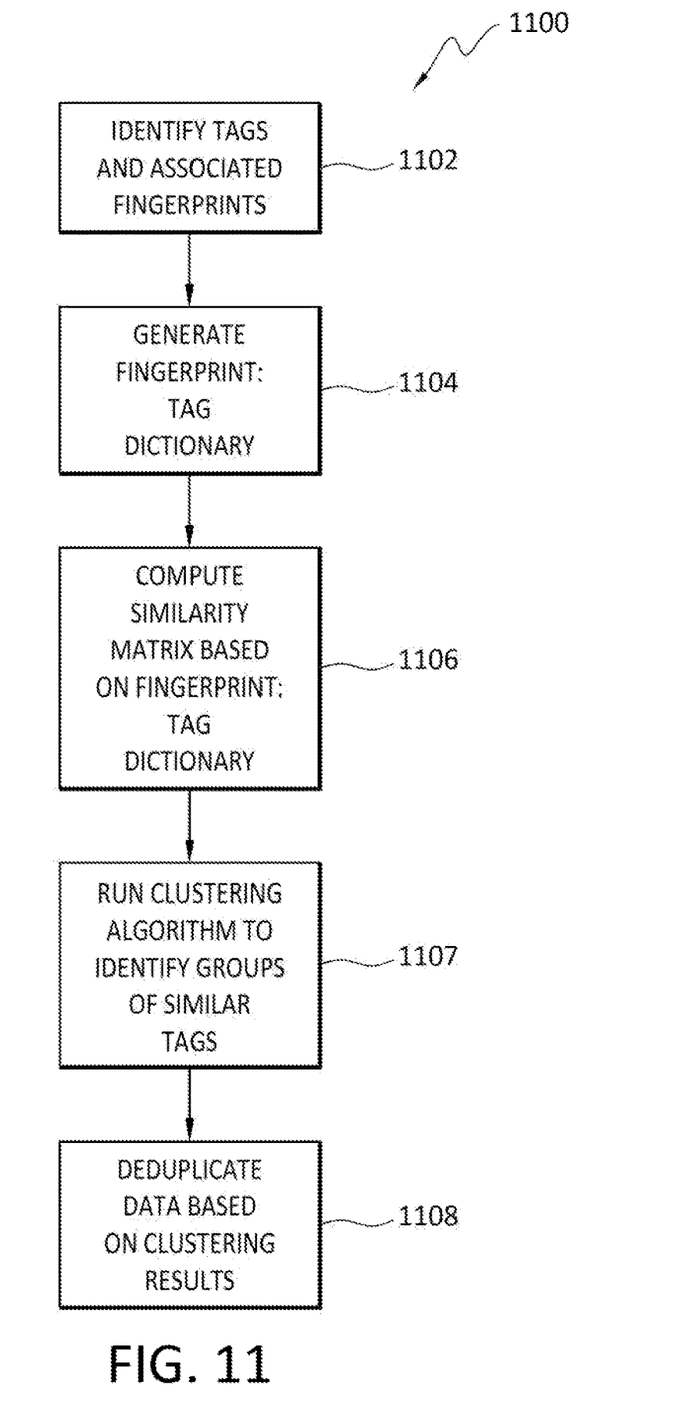
FIG. 11 is a flow chart directed to an example method.

It is noted with respect to the example method of FIG. 11 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 11, the example method 1100, which may be performed at one or more nodes of a data storage cluster, may begin when one or more tags and associated fingerprints are identified 1102. Each of the tags may include one or more fingerprints, and the tags may be located at a node of a data storage cluster, although that is not necessarily required.

Using the tags and associated fingerprints, a fingerprint:tag dictionary may then be generated 1104. The fingerprint:tag dictionary may include a plurality of entries, where each entry includes or identifies a fingerprint, and the tag or tags that include that fingerprint.

The tag and fingerprint information in the fingerprint:tag dictionary may then be used to calculate a similarity matrix 1106. The similarity matrix may identify, for each tag in the fingerprint:tag dictionary, a relative similarity between that tag and one, some, or all, of the other tags in the fingerprint:tag dictionary.

After the similarity matrix has been computed 1106, a clustering algorithm may be run 1107 to identify groups of similar tags in the similarity matrix. The output of the clustering algorithm may be used for various purposes. For example, the groups of similar tags may be used to identify which tags (or clients) are similar, and which are not. With this information, determinations may be made as to placement, or location, of the clients. As another example, if the user has a need to migrate, or delete, data, such as to free up storage space, the similarity information, that is, the groups of similar tags may help to identify which tags are sufficiently similar, or identical, such that one or more can be deleted, thereby freeing storage space. On the other hand, tags that are not sufficiently similar, or completely different, from other tags may be moved to a relatively less expensive storage system rather than remaining in a more expensive deduplication storage system.

With the relative similarity between tags known, the respective data portions associated with the tags may then be evaluated to determine if they are candidates for deduplication. When the tags of a pair of tags have the requisite, or greater, similarity to each other, they may be deduplicated 1108 based on the information in the similarity matrix, such as by moving the tags so that they are co-located on the same node.

Note that, in general, an example clustering process may involve combining the 2 most similar tags, or clusters, of a similarity matrix to form a new cluster. The identities of the tags remain the same. Thus, more and more tags may be added into a cluster of similar tags. In more detail, the similarity matrix may be used, for example, to identify the 2 most similar objects of the matrix, which may then be combined together to form a new cluster. Note that each object comprise a respective union of multiple tags. This combining or clustering process may be iteratively performed until the last object which, due to the iterative combining process, comprises a union of all the objects. At each step or iteration, there is one less object in the matrix, due to the combining of the 2 most similar objects, and so one dimension can be removed from the matrix with each iteration.

D. Further Example Embodiments

Following are some further example embodiments of the invention. These are presented only by way of example and are not intended to limit the scope of the invention in any way.

Embodiment 1. A method, comprising: generating a fingerprint:tag dictionary that comprises a plurality of fingerprints and a plurality of tags, and the fingerprint:tag dictionary identifies, for each fingerprint, the tag or tags which include that fingerprint; computing a similarity matrix based on the fingerprint:tag dictionary, and the similarity matrix identifies, for each pair of tags in the fingerprint:tag dictionary, a relative similarity of the tags in the pair to each other; running a clustering algorithm to identify groups of similar tags in the similarity matrix; and deduplicating, based on the groups of similar tags, respective data associated with the fingerprints.

Embodiment 2. The method as recited in embodiment 1, wherein the similarity of tags in a pair of tags comprises a Jaccard similarity measure.

Embodiment 3. The method as recited in any of embodiments 1-2, wherein all of the similarities are determined with a single scan of the fingerprint:tag dictionary.

Embodiment 4. The method as recited in any of embodiments 1-3, wherein computing the similarity matrix based on the fingerprint:tag dictionary is relatively more efficient, in terms of CPU complexity, IO load, and memory usage, than calculating the similarity matrix would be using a brute force approach or a bloom filter approach.

Embodiment 5. The method as recited in any of embodiments 1-4, wherein the deduplication is performed at a data storage node of a cluster.

Embodiment 6. The method as recited in any of embodiments 1-5, wherein computing the similarity matrix comprises computing a similarity, pairwise, between each pair of tags in the fingerprint:tag dictionary.

Embodiment 7. The method as recited in any of embodiments 1-6, wherein the fingerprints and tags in the fingerprint:tag dictionary are arranged in a plurality of entries, and each entry comprises a respective fingerprint and all the tags which include that fingerprint, and computing the similarity matrix comprises reading the entries sequentially for each fingerprint and, for each entry, determining the similarity of all the tags in that entry.

Embodiment 8. The method as recited in any of embodiments 1-7, wherein each tag comprises a respective file.

Embodiment 9. The method as recited in any of embodiments 1-8, further comprising determining a size of one or more of the tags.

Embodiment 10. The method as recited in any of embodiments 1-9, further comprising determining an intersection between one or more pairs of tags.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ('PCM'), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 12:
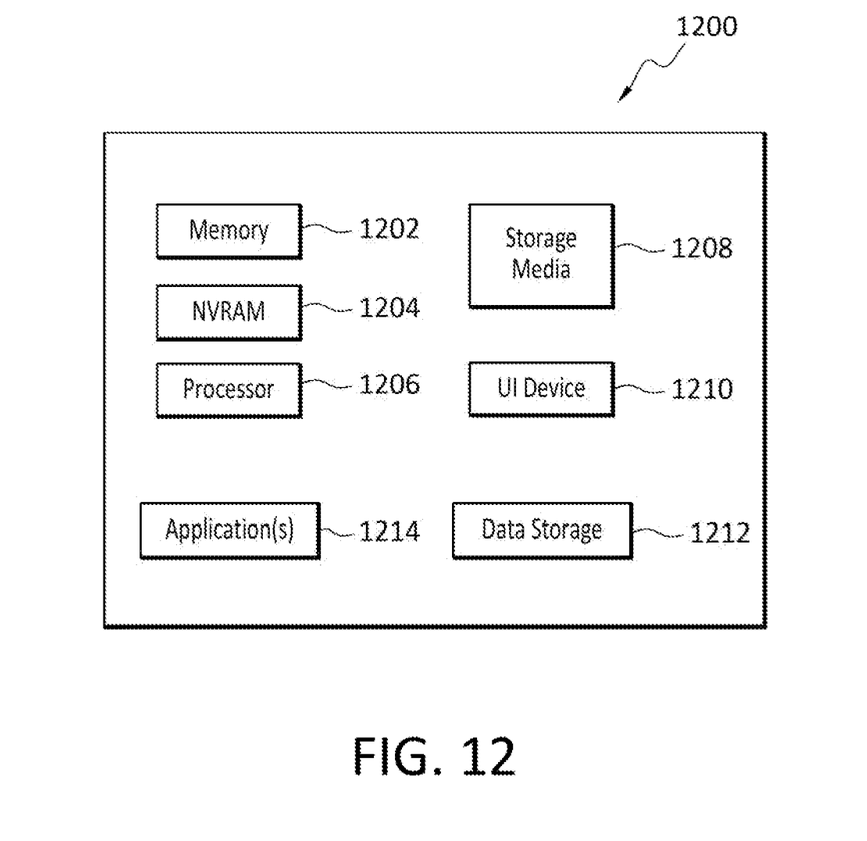
FIG. 12 discloses an example entity configured to perform any of the disclosed methods and processes.

With reference briefly now to FIG. 12, any one or more of the entities disclosed, or implied, by FIGS. 1-11 and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 12.

In the example of FIG. 12, the physical computing device 1200 includes a memory 1202 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI device 1210, and data storage 1212. One or more of the memory components 1202 of the physical computing device 1200 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
generating a fingerprint: tag dictionary that comprises a plurality of pairs, wherein each pair includes a fingerprint and a list of tags, which include the fingerprint, wherein each tag is assigned to one or more fingerprints;
computing one or more similarity matrixes based on every pair of two tags in the fingerprint:tag dictionary, wherein each similarity matrix identifies a relative similarity between a first list of fingerprints assigned to one of the two tags and a second list of fingerprints assigned to the other one of the two tags;
running a clustering algorithm to identify groups of similar tags based on the one or more similarity matrixes; and
deduplicating, based on the groups of similar tags, respective data associated with the fingerprints,
wherein at least one of the tags includes 10,000 fingerprints, which are generated by a hashing process.

2. The method as recited in claim 1, wherein the similarity of tags in a pair comprises a Jaccard similarity measure.

3. The method as recited in claim 1, wherein all of the similarities are determined with a single scan of the fingerprint: tag dictionary.

4. The method as recited in claim 1, wherein computing the one or more similarity matrixes is more efficient, in terms of computational complexity, IO load, and memory usage, than calculating the similarity matrix using a brute force approach or a bloom filter approach.

5. The method as recited in claim 1, wherein the deduplication is performed at a data storage node of a cluster.

6. The method as recited in claim 1, wherein computing the one or more similarity matrixes comprises computing a similarity, pairwise, among tags in each pair in the fingerprint:tag dictionary.

7. The method as recited in claim 1, wherein the fingerprints and tags in the fingerprint:tag dictionary are arranged in a plurality of entries, and each entry comprises a respective fingerprint and all the tags which include the respective fingerprint, and
computing the one or more similarity matrixes comprises reading a list of tags sequentially for a fingerprint in each pair and, for each pair, determining the similarity of all the tags in each pair.

8. The method as recited in claim 1, wherein each tag comprises one or more respective files.

9. The method as recited in claim 1, further comprising determining a size of one or more of the tags.

10. The method as recited in claim 1, further comprising determining an intersection between one or more tags in each pair.

11. A non-transitory storage medium having stored therein instructions that are executable by one or more hardware processors to perform operations comprising:

generating a fingerprint: tag dictionary that comprises a plurality of pairs, wherein each pair includes a fingerprint and a list of tags, which include the fingerprint, wherein each tag is assigned to one or more fingerprints;

computing one or more similarity matrixes based on every pair of two tags the fingerprint:tag dictionary, wherein each similarity matrix identifies a relative similarity between a first list of fingerprints assigned to one of the two tags and a second list of fingerprints assigned to the other one of the two tags;

running a clustering algorithm to identify groups of similar tags based on the one or more similarity matrixes; and deduplicating, based on the groups of similar tags, respective data associated with the fingerprints, wherein at least one of the tags includes 10,000 fingerprints, which are generated by a hashing process.

12. The non-transitory storage medium as recited in claim 11, wherein the similarity of tags in a pair comprises a Jaccard similarity measure.

13. The non-transitory storage medium as recited in claim 11, wherein all of the similarities are determined with a single scan of the fingerprint: tag dictionary.

14. The non-transitory storage medium as recited in claim 11, wherein computing the one or more similarity matrixes is more efficient, in terms of computational complexity, IO load, and memory usage, than calculating the similarity matrix using a brute force approach or a bloom filter approach.

15. The non-transitory storage medium as recited in claim 11, wherein the deduplication is performed at a data storage node of a cluster.

16. The non-transitory storage medium as recited in claim 11, wherein computing the one or more similarity matrixes comprises computing a similarity, pairwise, among tags in each pair in the fingerprint: tag dictionary.

17. The non-transitory storage medium as recited in claim 11, wherein the fingerprints and tags in the fingerprint: tag dictionary are arranged in a plurality of entries, and each entry comprises a respective fingerprint and all the tags which include the respective fingerprint, and computing the one or more similarity matrixes comprises reading a plurality of tags sequentially for a fingerprint in each pair and, for each pair, determining the similarity of all the tags in each pair.

18. The non-transitory storage medium as recited in claim 11, wherein each tag comprises one or more respective files.

19. The non-transitory storage medium as recited in claim 11, further comprising determining a size of one or more of the tags.

20. The non-transitory storage medium as recited in claim 11, further comprising determining an intersection between tags in each pair.

* * * * *